(12) United States Patent
Birke et al.

(10) Patent No.: US 6,962,127 B2
(45) Date of Patent: Nov. 8, 2005

(54) TACHOMETER POINTER INSTRUMENT

(75) Inventors: Lars Birke, Radelfzell (DE); Andreas Kail, Rielasingen (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 0 days.

(21) Appl. No.: 10/744,370

(22) Filed: Dec. 23, 2003

(65) Prior Publication Data

US 2004/0182305 A1 Sep. 23, 2004

(30) Foreign Application Priority Data

Dec. 27, 2002 (DE) .................... 202 19 989 U

(51) Int. Cl.⁷ .............................. B60K 35/00
(52) U.S. Cl. ............... 116/305; 116/62.4; 116/DIG. 5; 362/27; 362/489
(58) Field of Search ................. 116/305, 302, 116/303, 62.1, 334, 300, 280, 286, 284, DIG. 5, DIG. 36, 62.4; 180/90; 296/70; 340/459, 461, 462; 73/866.3; 362/22, 489

(56) References Cited

U.S. PATENT DOCUMENTS

| | | | | |
|---|---|---|---|---|
| 4,630,043 A | * | 12/1986 | Haubner et al. | 340/825.57 |
| 4,954,807 A | * | 9/1990 | Fleischer et al. | 340/459 |
| 5,003,433 A | * | 3/1991 | Fournier | 362/29 |
| 5,099,396 A | * | 3/1992 | Barz et al. | 361/818 |
| 5,406,303 A | * | 4/1995 | Salmon et al. | 345/75.1 |
| 5,437,185 A | * | 8/1995 | Panzica | 73/493 |
| 5,636,145 A | * | 6/1997 | Gorman et al. | 702/148 |
| 5,652,508 A | * | 7/1997 | Yamamoto | 324/166 |
| 5,709,358 A | * | 1/1998 | Kubota | 248/27.1 |
| 5,825,338 A | * | 10/1998 | Salmon et al. | 345/7 |
| 5,883,777 A | * | 3/1999 | Nishitani et al. | 361/647 |
| 5,971,558 A | * | 10/1999 | Peel | 362/26 |
| 5,977,868 A | * | 11/1999 | Itakura | 340/438 |
| 6,025,820 A | * | 2/2000 | Salmon et al. | 345/75.1 |
| 6,158,279 A | * | 12/2000 | Saiki | 73/493 |
| 6,239,982 B1 | * | 5/2001 | Bozzer et al. | 361/760 |
| 6,276,809 B1 | * | 8/2001 | Matsumoto | 362/26 |
| 6,379,015 B2 | * | 4/2002 | Wilhelm et al. | 362/23 |
| 6,407,663 B1 | * | 6/2002 | Huggett | 340/461 |
| 6,441,726 B1 | * | 8/2002 | Voto et al. | 340/438 |
| 6,511,342 B1 | * | 1/2003 | Hein et al. | 439/502 |
| 6,575,583 B2 | * | 6/2003 | Suzuki et al. | 362/23 |
| 6,587,759 B2 | * | 7/2003 | Obradovich et al. | 701/1 |
| 6,603,393 B2 | * | 8/2003 | Sumada et al. | 340/425.5 |
| 6,854,350 B2 | * | 2/2005 | Ayres | 73/866.3 |
| 6,902,308 B2 | * | 6/2005 | Love | 362/545 |
| 2003/0214391 A1 | * | 11/2003 | Kondo et al. | 340/425.5 |

FOREIGN PATENT DOCUMENTS

| | | |
|---|---|---|
| DE | 19625060 | 1/1998 |
| DE | 19737787 | 3/1999 |
| DE | 19802465 | 7/1999 |
| DE | 19904597 | 10/1999 |
| DE | 19623406 | 6/2000 |
| DE | 10110991 | 11/2002 |

* cited by examiner

Primary Examiner—R. Alexander Smith
(74) Attorney, Agent, or Firm—Tarolli, Sundheim, Covell & Tummino L.L.P.

(57) ABSTRACT

A tachometer pointer instrument for motorcycles comprises a housing which includes a housing base and a housing cover which is transparent at least in part. The tachometer pointer instrument also comprises a pointer drive module accommodated in the housing base and a number dial visible through the housing cover. The pointer drive module has a stepping motor, control electronics and a display unit which are built on a common printed circuit board and the pointer drive module is fastened on support structures formed in the housing base.

10 Claims, 3 Drawing Sheets

Figure 4:
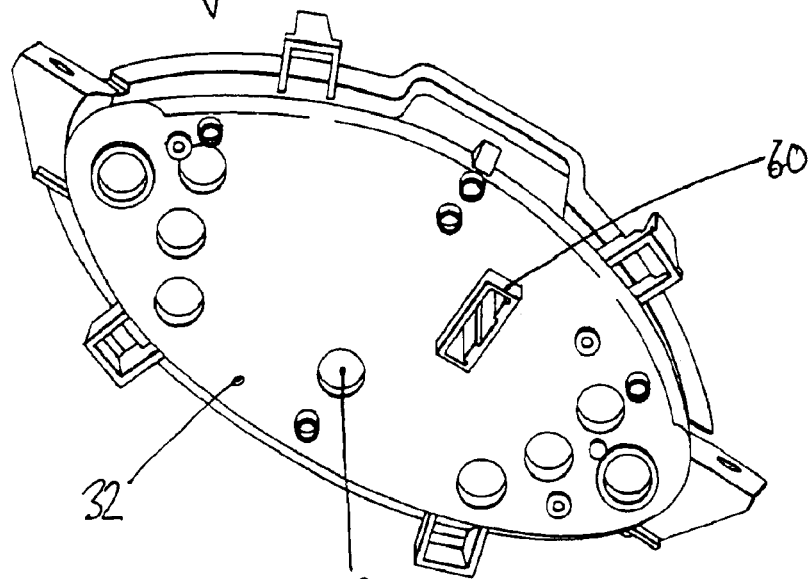

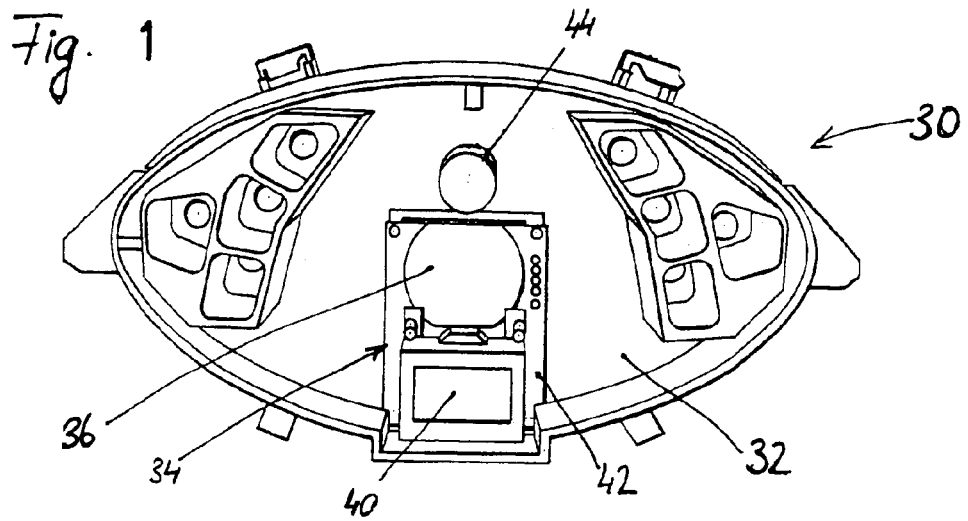
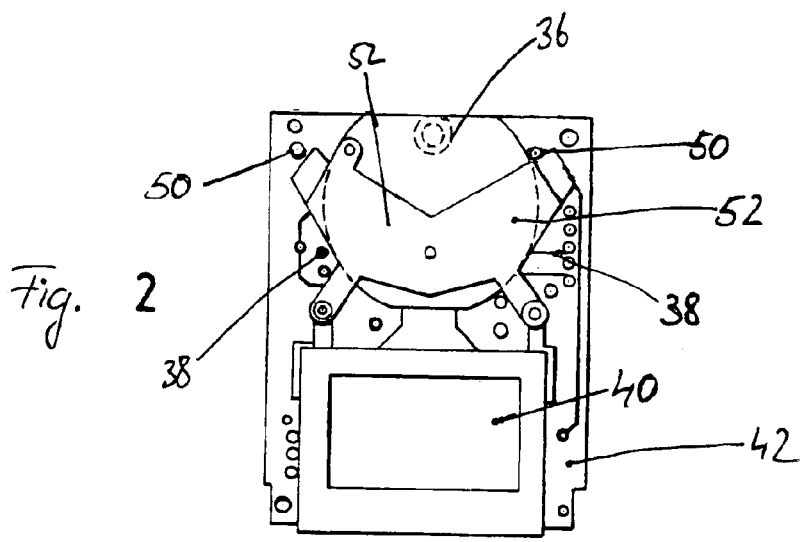
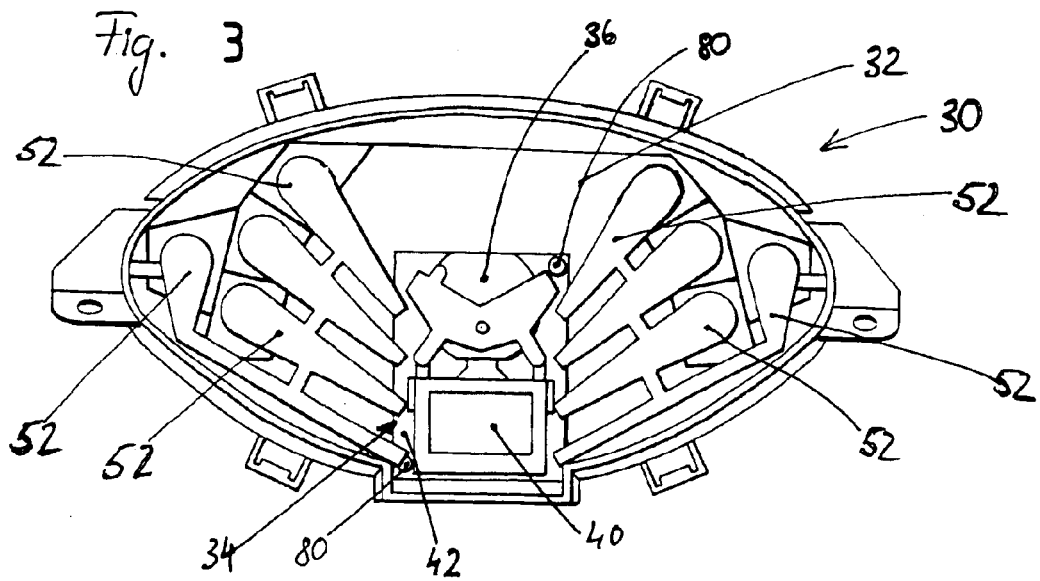

TACHOMETER POINTER INSTRUMENT

TECHNICAL FIELD

The invention relates to a tachometer pointer instrument for motorcycles.

BACKGROUND OF THE INVENTION

A conventional pointer instrument has a mechanical pointer drive module to which a tacho shaft is connected, and a kilometer counter likewise connected to the tacho shaft. In addition, further display instruments or display symbols can also be integrated in the housing, for example for the fuel filling level or the flasher control.

Electromechanical drives for tachometer pointer instruments are also known. These have a stepping motor and control electronics, the input signal of which is provided by a Hall sensor. Electromechanical drives have obvious advantages with regard to the elimination of the tacho shaft, absence of wear and accuracy of indication. The equipment of tachometer pointer instruments for simple motorcycles with such a drive, however, has not come into consideration hitherto for reasons of cost.

SUMMARY OF THE INVENTION

The invention provides a tachometer pointer instrument with electromechanical drive which is competitive with the conventional mechanical technology as regards cost, but greatly exceeds it in functionality. The tachometer pointer instrument according to the invention has a pointer drive module which has, built on a common printed circuit board, a stepping motor, control electronics and a display unit and is fastened on support structures formed in the housing base. Due to the integration of several components in a universal module which can be easily connected to different available housing constructions, large production quantities become possible, which is a prerequisite for an efficient mass production.

In the preferred embodiment of the invention, the printed circuit board is positioned by the support structures in the housing base. Thereby, installation tolerances are eliminated. In addition, preferably the housing base has an indentation in which an edge of the printed circuit board is held in a form-fitting manner. In this way, a sufficiently large surface area is provided for the display unit in the number dial underneath the pointer drive shaft. The support structures comprise integrally-molded domes, sockets or posts on which the printed circuit board is fastened by means of screws.

In further advantageous embodiments, a plug socket is formed on the outer side of the housing base, which plug socket surrounds a plurality of contact pins projecting through the housing base, which are connected with the printed circuit board inside the housing, preferably in that the inner ends of the contact pins are inserted directly into contact holes of the printed circuit board. In this way, an internal wiring of the instrument can be dispensed with.

Further simplifications are possible if an illumination of the number dial, of the various light symbols and of the display unit are required. The light sources required for this are then likewise mounted on the common printed circuit board. For the light distribution light guides are used which extend between the objects which are to be illuminated and the associated light sources.

Without much additional effort, the display unit can be equipped with various functions. The basic function is that of total distance display. Optional functions are, in particular: trip meter (resettable), time, fuel filling level and oil temperature or generally the functions of an onboard computer, which can be switched from one to another. In this embodiment, the control electronics comprise a microcomputer, and the adaptation to parameters given in the case of application, structural conditions and functionality options takes place simply by installing of an individually adapted software.

SHORT DESCRIPTION OF DRAWINGS

Figure 5:
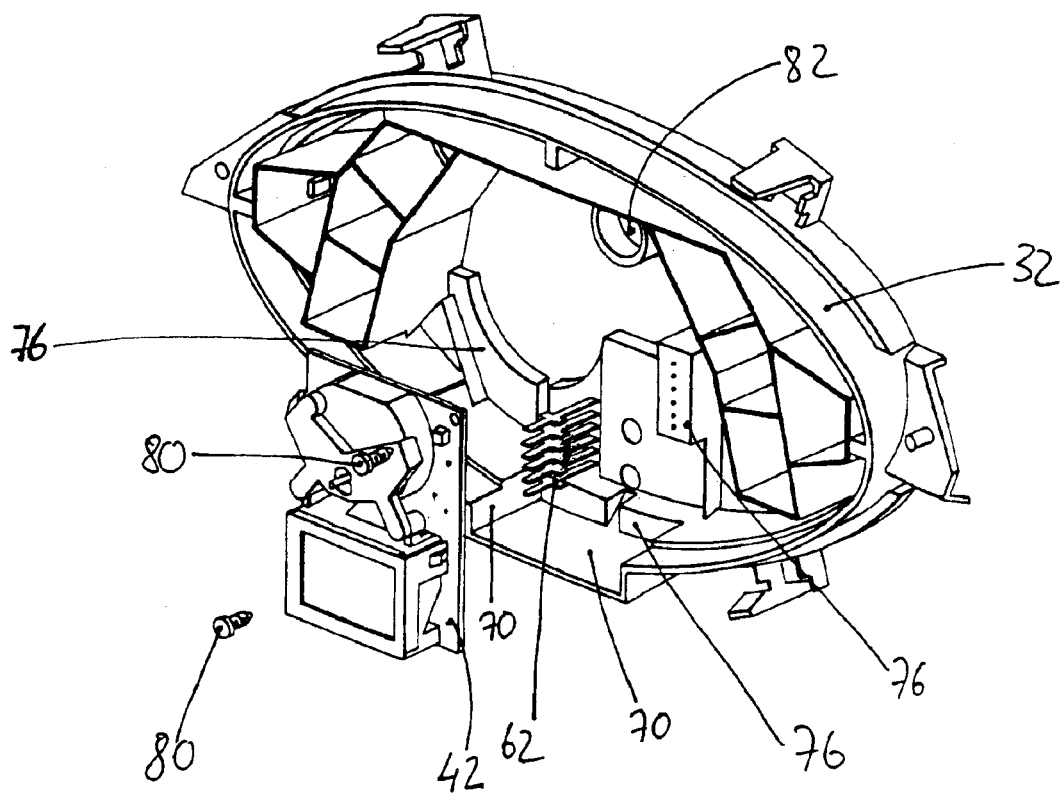

Further advantages and features of the invention will be apparent from the following description with reference to the enclosed drawings. The drawings show:

FIG. 1 a top view of a tachometer combination instrument with the housing opened and the number dial removed;

FIG. 2 a drive and display module of the instrument;

FIG. 3 a view similar to FIG. 1, but in an embodiment with light distribution by light guides starting from the printed circuit board of the drive and display module;

FIG. 4 a perspective view of the underside of the housing base;

FIG. 5 a perspective view to show the assembly; and

Figure 6:
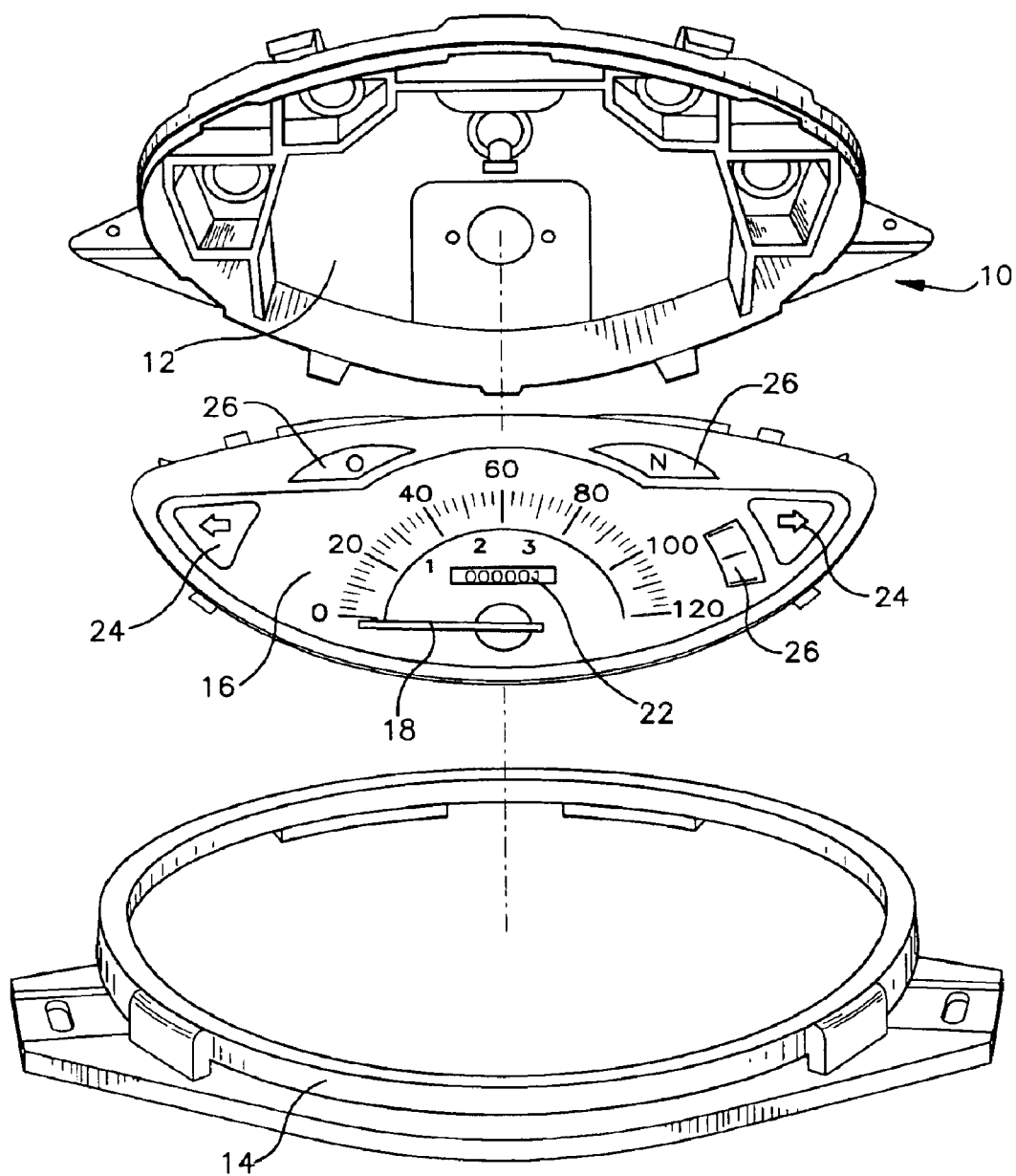

FIG. 6 a perspective view of a dismounted conventional tachometer pointer instrument with mechanical drive.

DETAILED DESCRIPTION OF PREFERRED EMBODIMENT

FIG. 6 of the drawings shows a conventional tachometer pointer instrument with mechanical drive in a disassembled state. The tachometer pointer instrument comprises a housing 10 with a housing base 12, a transparent housing cover 14 and a number dial 16 with a pointer 18 for displaying the speed of the motorcycle. The pointer 18 can be driven by a mechanical pointer drive. The number dial 16 further comprises a kilometer counter 22, flasher control symbols 24 and several other control symbols 26.

The tachometer pointer instrument shown in FIG. 1 of the drawings comprises a housing 30 with a housing base 32 and a pointer drive module 34 accommodated in the housing base 32. The pointer drive module 34 has a stepping motor 36, control electronics 38 (schematically shown in FIG. 2 of the drawings) and a display unit 40 which are built on a common printed circuit board 42. Above the printed circuit board 42 an incandescent bulb 44 is arranged. The common printed circuit board 42 with the stepping motor 36, the control electronics 38 and the display unit 40 are more clearly shown in FIG. 2 of the drawings. The stepping motor 36 is provided for driving a pointer of a number dial which covers the stepping motor 36 and is also accommodated in the housing. The number dial is for the analogous display of the speed of the motorcycle. In an assembled state of the instrument, the display unit 40 is integrated into the number dial. By means of the display unit 40 which is preferably a LCD (Liquid Crystal Display), additional information can be displayed. The basic function is preferably that of total distance display. Optional functions can be the total distance, the resettable trip meter, the fuel filling level, the time, the oil temperature and/or generally the functions of an onboard computer. The different functions can be switched between one another. The control electronics 38 contains the control of the display unit 40 and the stepping motor 36. In the preferred embodiment, the control electronics 38 comprises a microcomputer and the functionality of the control electronics is determined by an individually adapted software run on the microcomputer. In this way, the adaptation to parameters given in the case of application, structural conditions and functionality options can be achieved simply by installing of the individually adapted software.

The housing 30 further comprises a housing cover which is transparent at least in part so that the number dial with the display unit 40 is visible through the housing cover. FIG. 1 of the drawings shows the tachometer pointer instrument with the housing opened and the number dial removed. A housing cover of a tachometer pointer instrument according to the invention basically corresponds to the cover 14 of the conventional tachometer pointer instrument shown in FIG. 6 of the drawings. The number dial of a tachometer pointer instrument according to the invention comprises a recess for receiving the display unit 40 and preferably several other control symbols which can be illuminated.

FIG. 1 shows an embodiment of a tachometer pointer instrument in which the number dial is illuminated by means of the incandescent lamp 44 arranged above the printed circuit board 42.

In FIG. 2 of the drawings the printed circuit board 42 mounts several light-emitting components 50 to which light guides 52 are optically connected. The light-emitting components 50 are preferably light-emitting diodes (LEDs). The light guides 52 extend between the light-emitting components 50 and the number dial and the pointer for illuminating them.

FIG. 3 shows an embodiment of a tachometer pointer instrument according to the present invention in which the light guides 52 which are optically connected with the light-emitting components 50 on the printed circuit board 42 are associated with symbols in the number dial which are able to be illuminated. The symbols cannot be seen in FIG. 3, because FIG. 3 also shows the housing with the number dial removed, but the symbols are located in the number dial at selected places next to the places where the associated light guides 52 end.

FIG. 4 is a perspective view of the underside of the housing base 32. On the outside of the housing base a plug socket 60 is formed which surrounds a plurality of contact pins 62 penetrating through the housing base 32 (see also FIG. 5 of the drawings). In an assembled state of the tachometer pointer instrument, the contact pins 62 are connected with the printed circuit board 42 inside the housing. Preferably, the inner ends of the contact pins 62 are inserted directly into contact holes of the printed circuit board 42 so that there is no need for an internal wiring of the instrument.

As can be seen in FIG. 5 of the drawings, the housing base has, with respect to FIG. 5 of the drawings, at its lower edge an indentation 70 into which an edge of the printed circuit board 42 can be fitted. In the assembled state of the tachometer pointer instrument, the printed circuit board 42 is held in a form-fitting manner in the indentation 70. In this way, a sufficiently large surface area is provided for the display unit in the number dial underneath the pointer drive shaft.

Support structures 76 are formed in the housing base 32 on which the pointer drive module 34 is fastened. The support structures 76 can be configured as integrally-molded domes, sockets or posts. The printed circuit board 42 is preferably fitted by means of screws 80 on the support structures 76. According to the preferred embodiment of the invention, the printed circuit board 42 is positioned by the support structures 76 in the housing base 32. Thus, installation tolerances are eliminated.

As can be also seen in FIGS. 4 and 5 of the drawings, a through hole 82 is provided in the housing base 32 through which the pointer drive shaft of the stepping motor 36 extends in an assembled state of the tachometer pointer instrument.

Since the stepping motor 36, the control electronics 38 and the display unit 40 are integrated on a common printed circuit board 42 which can be easily accommodated in different housing constructions, the pointer drive module of a tachometer pointer instrument according to the invention can be produced in large quantities so that the production of a pointer drive module according to the present invention becomes very cost-effective.

What is claimed is:

1. A tachometer pointer instrument for a motor vehicle, said tachometer pointer instrument comprising a housing which includes a housing base and a housing cover which is transparent at least in part, and a pointer drive module accommodated in said housing base and a number dial visible through said transparent part of said housing cover, wherein said pointer drive module has a stepping motor, control electronics and a display unit which are built on a common printed circuit board and said pointer drive module is fastened on support structures formed in said housing base, wherein said printed circuit board mounts several light-emitting components to which light guides are optically connected, and wherein said light guides are associated with symbols in said number dial which are able to be illuminated, said symbols being located in said number dial at selected places next to the places where said associated light guides end.

2. The pointer instrument according to claim 1, wherein said printed circuit board is positioned by said support structures in said housing base.

3. The pointer instrument according to claim 1, wherein on the outside of said housing base a plug socket is formed, which surrounds a plurality of contact pins penetrating through said housing base, and wherein said contact pins are connected with said printed circuit board inside said housing.

4. The pointer instrument according to claim 3, wherein said inner ends of said contact pins are inserted directly into contact holes of said printed circuit board.

5. The pointer instrument according to claim 1, wherein said light-emitting components are light-emitting diodes.

6. The pointer instrument according to claim 1, wherein a light source is associated with said display unit.

7. The pointer instrument according to claim 1, wherein said display unit, related to said number dial, is arranged between said lower housing edge and said pointer drive shaft of said stepping motor.

8. The pointer instrument according to claim 1, wherein said control electronics comprise a microcomputer and the functionality of said control electronics is determined by the individually adapted software run on said microcomputer.

9. The pointer instrument according to claim 1, wherein said control electronics, in addition to the control of the stepping motor, contain the control of said display unit with at least one of the following functions:

total distance;
   trip meter, resettable;
   fuel filling level;
   time;
   oil temperature.

10. A tachometer pointer instrument for a motor vehicle, said tachometer pointer instrument comprising a housing which includes a housing base and a housing cover which is transparent at least in part, and a pointer drive module accommodated in said housing base and a number dial visible through said transparent part of said housing cover, wherein said pointer drive module has a stepping motor, control electronics and a display unit which are built on a common printed circuit board and said pointer drive module is fastened on support structures formed in said housing base, the outer contour of said housing base forming an indentation in which an edge of said printed circuit board is held in a form-fitting manner.

* * * * *